P. O. Soper.
Hay Knife
No. 2884 Reissued Feb. 25, 1868.
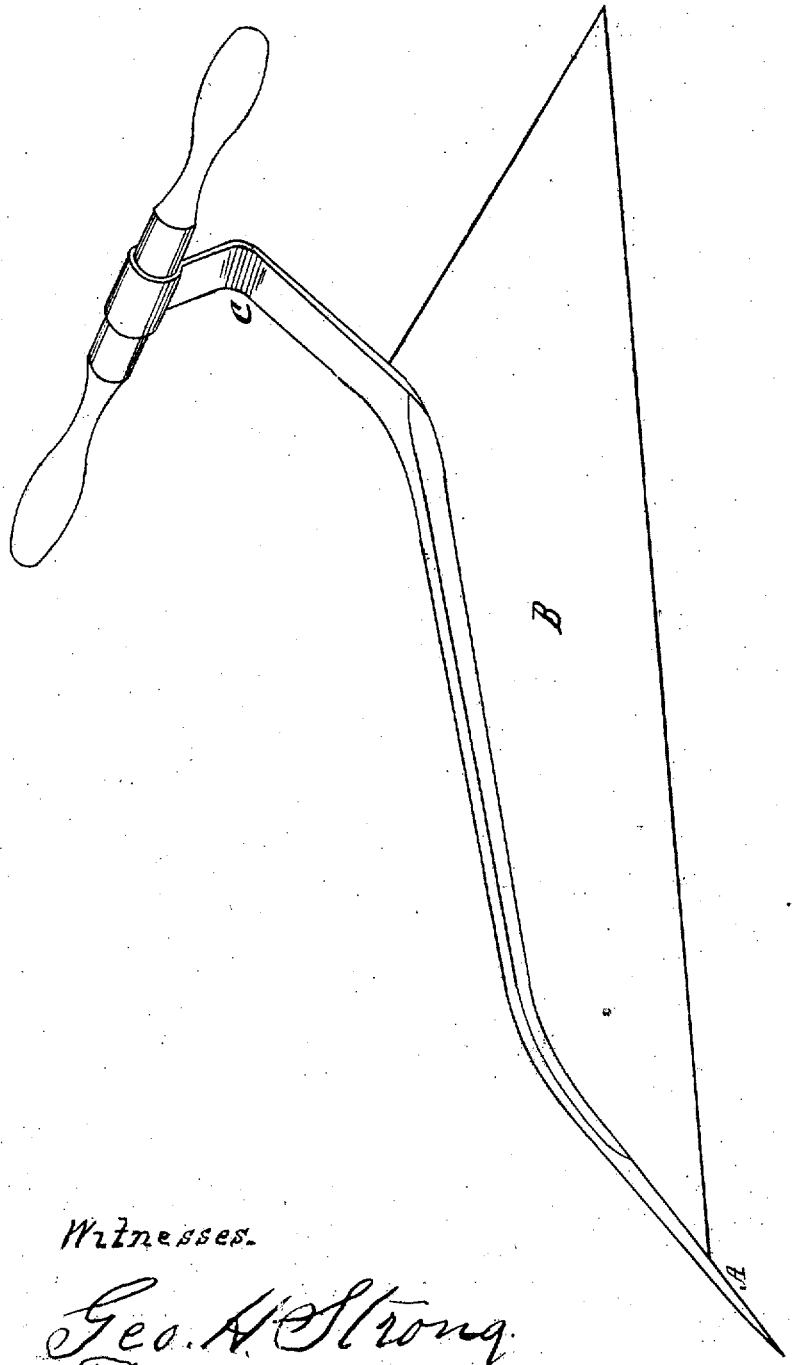
Witnesses.
Geo. H. Strong.
F. G. Hoin.
Inventor.
Philo C Soper

UNITED STATES PATENT OFFICE.

PHILO O. SOPER, OF SAN FRANCISCO, CALIFORNIA.

IMPROVEMENT IN HAY-KNIVES.

Specification forming part of Letters Patent No. 61,576, dated January 29, 1867; Reissue No. 2,884, dated February 25, 1868.

*To all whom it may concern:*

Be it known that I, PHILO O. SOPER, of the city and county of San Francisco, State of California, have invented an Improved Hay-Knife; and I do hereby declare the following specification and accompanying drawing to be sufficient to enable any person skilled in the art or science to which it most nearly appertains to make and use my said invention or improvement without further invention or experiment.

The nature of my invention is to provide a hay-knife that will cut obliquely while being moved perpendicularly, so constructed and attached obliquely to the shank that as the knife is thrust in the hay perpendicularly with the shank at each downward stroke an oblique cutting is made by the edge of the blade. The back of the lower part of the blade coming in contact with the hay, holds the knife to its work, while the yielding of the hay admits of a sufficient oblique movement to cause it to cut well. Thus a downward thrust of the knife is all that is necessary to work it, and the hay to be cut is always directly under the knife and its operator.

In order to more fully illustrate and describe my invention, reference is had to the accompanying drawing and letters marked thereon.

C represents the shank and handle of my hay-knife, which may be of any length desired, and curved sufficiently at the handle to keep the hand clear from the stack.

B represents the blade with a straight edge, the upper point having an acute angle, or curved like the lower.

A represents a point extending below the point of the blade B, to be employed or not. The back of the lower point of the blade B, standing nearly parallel to the shank C, has the effect to hold the knife to its work, but would be assisted by the point A.

Having thus described my invention, what I claim, and desire to secure by Letters Patent, is—

1. The construction of the blade B, substantially as described.

2. The bearing of the shank C, in connection with the angle given to the edge of the blade B, substantially as and for the purpose described.

3. The point A, substantially as and for the purposes above described.

In witness whereof I have hereunto set my hand and seal.

PHILO O. SOPER. [L. S.]

Witnesses:

C. W. M. SMITH,

GEO. H. STRONG.